No. 12,650. REISSUED MAY 14, 1907.
B. H. COFFEY.
DREDGING AND EXCAVATING MACHINE.
APPLICATION FILED JAN. 3, 1907.
2 SHEETS—SHEET 1.
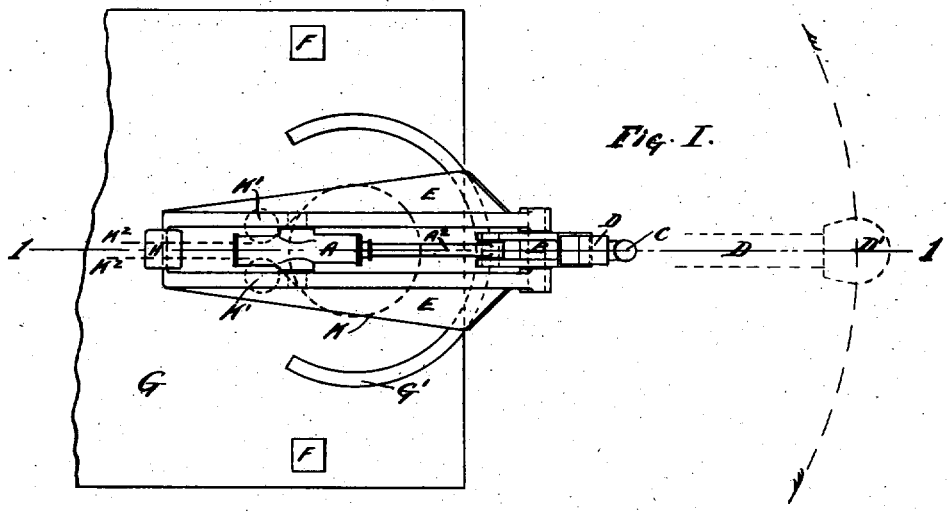
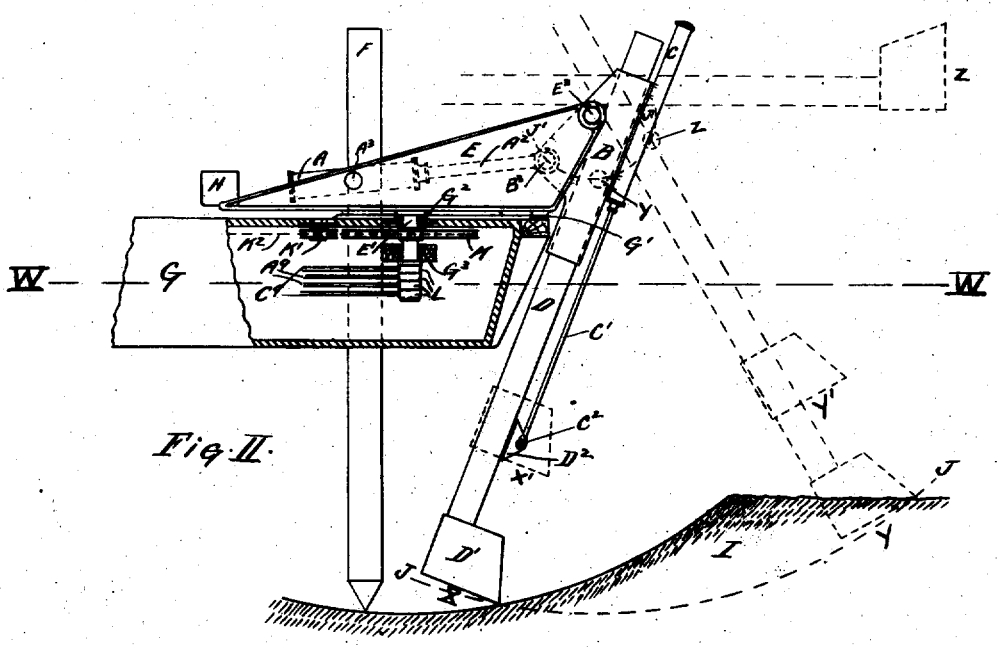
Witness
John J. Brewster Coffey
Louis Furry
Inventor
Burton H. Coffey
THE NORRIS PETERS CO., WASHINGTON, D. C.

No. 12,650. REISSUED MAY 14, 1907.
B. H. COFFEY.
DREDGING AND EXCAVATING MACHINE.
APPLICATION FILED JAN. 3, 1907.
2 SHEETS—SHEET 2.
Fig. III.
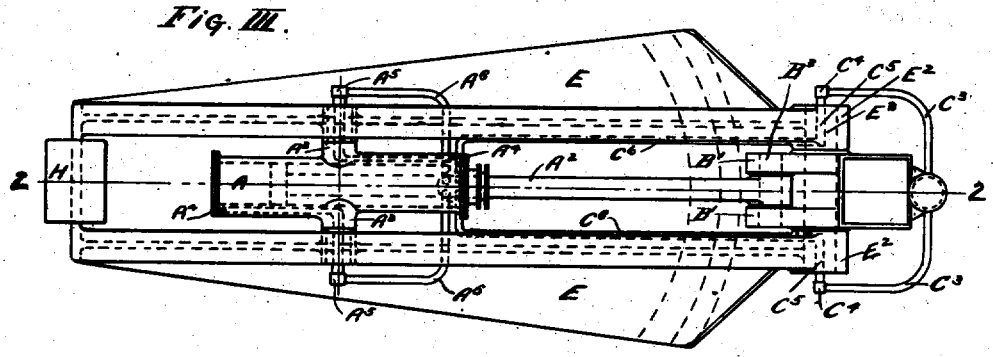
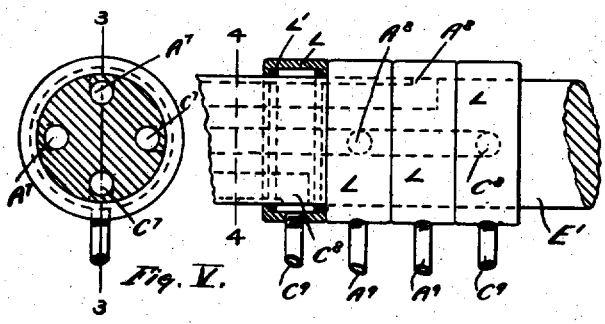
Fig. IV.
Fig. V.
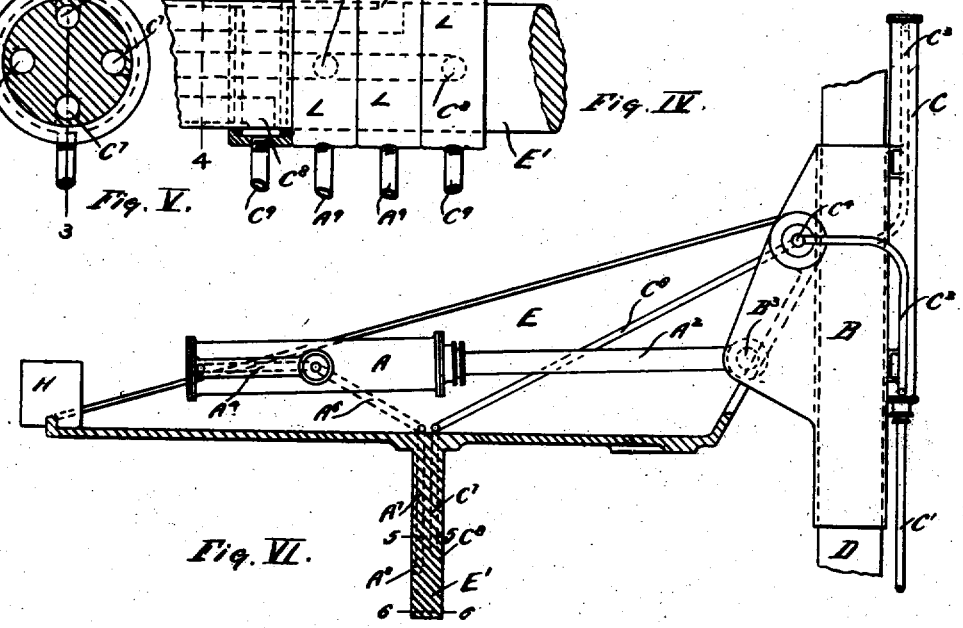
Fig. VI.
Inventor
Witnesses:
John J. Brewster Coffey
Louis Furry
THE NORRIS PETERS CO., WASHINGTON, D.C.

UNITED STATES PATENT OFFICE.

BARTON H. COFFEY, OF BOSTON, MASSACHUSETTS.

DREDGING AND EXCAVATING MACHINE.

No. 12,650. Specification of Reissued Letters Patent. Reissued May 14, 1907.

Original No. 824,283, dated June 26, 1906. Application for reissue filed January 3, 1907. Serial No. 350,679.

*To all whom it may concern:*

Be it known that I, BARTON H. COFFEY, a citizen of the United States, residing at Boston, in the county of Suffolk and State of Massachusetts, have invented a new and useful Improvement in Dredging and Excavating Machines, of which the following is a specification.

The objects of this invention are—

First, to simplify machinery of this class by eliminating the A-frame, boom, hoisting and backing chains, and all the attendant drums, gears, sheaves, brakes, frictions, &c.

Second, to increase the digging efficiency by applying the maximum power at the point of maximum resistance—that is, when the dipper is coming through the bank. In present dredging-machines not over a third of this power is available, owing to the acute angle between the hoisting-tackle and the dipper-handle; also to decrease the heeling of the dredge when swinging over the scow, caused by the heavy overhanging boom, by doing away with the boom altogether and counterbalancing the remaining moving parts.

Third, to increase the economy of operating by decreasing lost time, repairs, and wear and tear through substituting more reliable machinery for that eliminated.

The invention consists, broadly, in transmitting the power to the dipper to force it through the bank by means of the dipper-handle instead of by hoisting-tackle, as is customary. Other features, adding to the efficiency of operation, will be fully explained, and set out in the claims.

Reference now being had to the accompanying drawings, Figure I is a plan view showing the invention attached to the forward part of a dredge. Fig. II is an elevation of the same, showing the hull partly in section on the line 1 1 of Fig. I. Fig. III is a plan of the invention in detail and to a larger scale. Fig. IV is an elevation, partly in section, of the hydraulic distributing-rings, showing one of them in section on the line 3 3 of Fig. V and also a part of the shaft E′ broken away at the lines 5 5 and 6 6 of Fig. VI. Fig. V is an end view of same in section on line 4 4 of Fig. IV. Fig. VI is an elevation of Fig. III, showing the housing in section on the line 2 2 of Fig. III.

The same letters of reference designate the same parts in each figure.

In Figs. I and II, G represents the forward end of a dredge-hull floating at the water-line W W, with spuds F to resist the thrust of the dipper D′. The means for operating these spuds are not shown, as they form no part of my invention and are quite clear to those skilled in the art. Upon the deck of the hull G is mounted the rotatable housing E, supported on the center bearing $G^2$ and the circular track G′. Extending from the bottom of the housing E and integral therewith is the vertical shaft E′, passing through the bearings $G^2$ and $G^3$, integral with the hull G. Upon the shaft E′ and rigidly attached thereto is mounted the swinging wheel K. Attached to the wheel K are the swinging-chains $K^2$, which pass around same, then around the sister sheaves K′, and thence aft to the drums of the swinging-engine or other means of actuating the swinging movement. (Not shown.) As the swinging motion forms no part of my invention and is similar to that now in use and understood by those skilled in the art, no further description is deemed necessary.

Referring to Figs. III and VI, upon the housing E (shown in section in Fig. VI) is mounted the hydraulic cylinder A, carried by the hollow trunnions $A^3$. This housing also carries the guide B, rotatable upon the pin $E^3$, which in turn is rigidly held by the bearings $E^2$. The piston and piston-rod $A^2$, actuated by the cylinder A, is pinned to the guide B through the lugs B′ and pin $B^3$. It is obvious that any motion of the piston-rod $A^2$ will cause the guide B to rotate about the fixed pin $E^3$. Freely sliding through the guide B is the dipper-handle D, to which is attached the dipper D′. Movement in either direction through the guide B is given to the dipper-handle D by means of the hydraulic cylinder C, secured rigidly to the guide B, and whose piston and piston-rod C′ is pinned to the dipper-handle D through the medium of the bracket $D^2$, integral with the dipper-handle, and the pin $C^2$.

It will be obvious on inspection that the piece "B," Fig. VI, resolved into its elements, is the combination of a crank whose center line is $B^2$—$B^2$, rotating on the center of the pin $E^3$; and a straight parallel guide rotating on the same center and adapted to receive the sliding dipper-handle D: the crank driving the guide, either through being integral with the same, or by the two being rigidly connected, as by keying both to the pin $E^3$. The angle $B^4$ between the center line of the crank, $B^2$—$B^2$, and any sliding surface of the guide, determines the point on the dipper arc J—J, Fig. II, where the tangential thrust becomes a maximum, thus enabling the designer to so locate this point that it shall coincide with the point of maximum resistance offered by the material to be excavated.

In order to operate the double-acting cylinders A and C, it is necessary that some fluid under pressure, as water or oil, should enter at one end of the cylinder simultaneously with the other end being open to exhaust and that such entrance and egress of fluid be under the control of the person running the machine. This is accomplished as follows, (see Figs. III, IV, V, VI:) In the walls of the cylinder A are cored the passages $A^4$, leading from the ends of the cylinder and through the trunnions $A^3$. To these openings are attached the swing-joints $A^5$, from which lead pipes $A^6$ to the top of the vertical shaft E′. Through the vertical shaft E′ are bored four holes $A^7$ $A^7$ $C^7$ $C^7$ with side outlets $A^8$ $A^8$ $C^8$ $C^8$ at different levels, but equidistant. To the top of the holes $A^7$ are secured the pipes $A^6$. It is obvious that this arrangement gives a separate closed conduit from each end of the cylinder A to the surface of the shaft E′. In a similar manner, by means of the pipes $c^3$, the swing-joints $C^4$, the holes $C^5$ in the pin $E^3$, the pipes $C^6$, the holes $C^7$ in the shaft E′, and the openings $c^8$, is the cylinder C connected with the surface of the shaft E′. It should be noted that the swing-joints $A^5$ and $C^4$ permit rotation of the respective cylinders A and C. Covering the openings $A^8$ and $C^8$ and central therewith are the distributing-rings L, packed with the double cup-leathers L′. Leading from the four rings L are the four pipes $A^9$ $A^9$ $c^9$ $c^9$. This arrangement allows the shaft E′ to rotate within the stationary rings L, at the same time maintaining a separate fluid-tight connection from the stationary pipes $A^9$ and $c^9$ to each end of the cylinders A and C.

By connecting the $A^9$ and $c^9$ pipes each respectively with a hydraulic four-way valve and the pressure and exhaust openings of the valves with a pressure-pump and exhaust-tank it will be clear that the cylinders A and C may be operated from the most convenient point on the dredge by locating the valves or the levers connected with them at that point. By locating the swinging levers at this same point the three motions necessary to complete the dredging cycle may be commanded by one operator.

The four-way valves, pressure-pump, exhaust-tank, &c., are not shown, as they form no part of my invention and are quite obvious to those skilled in the art.

When the dipper D′ swings to starboard or port, as shown by the dotted arc in Fig. I, the tendency is to heel the hull G in the direction of swing caused by the excess of weight of the moving parts on that side of the center of flotation of the hull G. This action causes heavy rolling and damage to the scow alongside and also increases the hoist of the dipper necessary to clear the scow when light. This fault is remedied by introducing the counterweight H.

The complete dredging cycle with this machine is as follows, (see Fig. II:) Starting with the dipper D′ in the position X, pressure is admitted in the cylinder A, forcing out the piston-rod $A^2$ and causing the guide B, dipper-handle D, and dipper D′ to describe the arc J′ J through the bank I until the position Y is assumed. At this point pressure is admitted in the cylinder C, drawing in the piston-rod C′, and so pulling the dipper-handle D through the guide B till the position Y′ is reached. The position Y′ is fixed by the distance from the center of hull G to the center of the scow being loaded alongside, (not shown,) so that when the dipper has reached the position Z high enough to clear the scow and is swung over same it will dump approximately on the center line of the scow. After the dipper is dumped it is swung back, pressure admitted to the cylinder A to draw in the piston-rod $A^2$, and so lower the dipper to the position X′. Pressure is then released from the cylinder C, permitting the dipper to drop to the position X, the starting-point, and so on.

It will be obvious to those skilled in this art that modifications may be made in construction from that shown and described without departing in spirit from the fundamental idea involved—as, for instance, the employment of gearing instead of hydraulics to drive the dipper-handle. Therefore I do not limit myself to the construction shown.

Having described my invention, I claim—

1. In a dredge or excavating machine, a housing rotatable upon a vertical axis, a dipper-handle guide on said housing rotatable upon a horizontal axis, a dipper-handle longitudinally movable upon the guide, forces applied to rotate the housing in opposite directions, forces applied at one side of its axis to rotate the guide in opposite directions, and forces applied to move the dipper-handle in opposite directions; for the purposes set forth.

2. In a dredge or excavating machine, a dipper-handle adapted to drive a dipper, rotatable about a vertical and upon a horizontal axis, and longitudinally movable at right angles to the horizontal axis, means to move same longitudinally, means to rotate same about the vertical axis, and a force-developing or multiplying organ or organs directly connected to rotate same about the horizontal axis; for the purposes set forth.

3. In a dredge or excavating machine, a housing rotatable upon a vertical axis, carrying a dipper-handle guide rotatable upon a horizontal axis, together with a force-developing or multiplying organ or organs to rotate said guide in opposite directions at will; for the purposes set forth.

4. In a dredge or excavating machine, a dipper-handle guide rotatable upon a horizontal axis; in combination with a directly connected force-developing or multiplying organ to rotate same.

5. In a dredge or excavating machine, a crank rotatable upon a horizontal axis, integral with, or rigidly connected to, a guide; a dipper-handle, adapted to drive a dipper, movable upon the guide; an angle between the crank and guide, making the zone of maximum rotating effort coincide with an assigned portion of the arc described by the dipper; in combination with means to rotate the crank, and means to move the dipper-handle for the purposes set forth.

6. In a dredge or excavating machine, a housing rotatable upon a vertical axis, carrying a guide integral with, or rigidly connected to, a crank rotatable upon a horizontal axis; a dipper-handle adapted to drive a dipper, movable upon the guide; an angle between the crank and the guide, making the zone of maximum rotating effort coincide with an assigned portion of the arc described by the dipper: in combination with, means to rotate the housing, means to rotate the crank, and means to move the dipper-handle, for the purposes set forth.

7. In a dredge or excavating machine, a dipper-handle guide rotatable upon a horizontal axis; in combination with a hydraulic cylinder to rotate same, and means to operate the cylinder, substantially as described.

8. In a dredge or excavating machine, a housing rotatable upon a vertical axis, carrying a dipper-handle guide rotatable upon a horizontal axis; and a hydraulic cylinder to rotate the guide: in combination with means to rotate the housing and means to operate the cylinder, substantially as described.

In testimony whereof, I have signed my name to this specification in the presence of two subscribing witnesses.

BARTON H. COFFEY.

Witnesses:
IVAN L. C. GOODING,
JOHN M. HOLMES.